(12) United States Patent
Creamer et al.

(10) Patent No.: US 7,099,455 B2
(45) Date of Patent: Aug. 29, 2006

(54) MANAGING VARIABLE DATA THROUGH LINE INFORMATION DATABASE (LIDB) ACCESS IN A PUBLIC SWITCHED TELEPHONE NETWORK (PSTN)

(75) Inventors: Thomas E. Creamer, Boca Raton, FL (US); Neil Katz, Parkland, FL (US); Joseph H. McIntyre, Austin, TX (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/730,331

(22) Filed: Dec. 8, 2003

(65) Prior Publication Data

US 2005/0123120 A1 Jun. 9, 2005

(51) Int. Cl.
*H04M 3/00* (2006.01)

(52) U.S. Cl. ................. 379/265.09; 379/221.09
(58) Field of Classification Search ............ 379/265.09, 379/221.09
See application file for complete search history.

(56) References Cited

U.S. PATENT DOCUMENTS

| | | | | | |
|---|---|---|---|---|---|
| 5,987,116 | A | * | 11/1999 | Petrunka et al. | 379/265.13 |
| 6,115,737 | A | * | 9/2000 | Ely et al. | 709/203 |
| 6,233,313 | B1 | * | 5/2001 | Farris et al. | 379/112.01 |
| 6,556,818 | B1 | * | 4/2003 | Meehan | 455/406 |
| 2003/0009372 | A1 | * | 1/2003 | Nyhan et al. | 705/10 |
| 2004/0022380 | A1 | * | 2/2004 | Lynam et al. | 379/207.13 |

OTHER PUBLICATIONS

Author Unknown, *Advanced Intelligent Networks: Opportunities in Network Control for the Coming Decade* (*Sample*), Global Information, Inc. (visited Nov. 2, 2003) <http://www.giI.co.jp/english/ci2749_intelligentnetworks_summary,html>.
Zeichick, Alan, *Signaling System 7*, Control Your IT Environment (visited Nov. 4, 2003) <http://www.networkmagazine.com/shared/printableArticle.jhtml?articleID=8702253>.
Author Unknown, *LIDB Access and Transport*, Telecommunication Services, LIDB Access and Transport–VeriSign Inc. (visited Oct. 13, 2003) <http://www.verisign.com/telecom/products/database/lidbTransport.html>.

(Continued)

*Primary Examiner*—Creighton Smith
(74) *Attorney, Agent, or Firm*—Jean Sullivan; Steven M. Greenberg; Carey, Rodriguez, Greenberg & Paul, LLP

(57) ABSTRACT

A method, system and apparatus for managing variable information in a line information database (LIDB). In summary, a LIDB which has been configured in accordance with the present invention and which further has been disposed within a public switched telephone network (PSTN) can include a first collection of invariant data persisted in individual records in the LIDB. Each of the records can have an association with a subscriber in the PSTN. A second collection of variable data can be persisted in the individual records in the LIDB. Specifically, the variable data can have been produced in an application deployed outside of the PSTN in a data communications network. Finally, a query interface can be included in the LIDB (or in association with the LIDB) to retrieve the variable data therein and to persist variable data therein.

9 Claims, 3 Drawing Sheets

OTHER PUBLICATIONS

O'Doherty,Phelim, *Jain Slee Principles*, (May 2003) Motivation Behind the JAIN SLEE Specification (visited on Oct. 13, 2003) <http://java.sun.com/products/jain/article_slee_principles.html>.

Author Unknown, *Signaling Background*, Ulticom, Ulticom–SS7 signaling, SIGTRAN, SS7/1P (M2PA, M3UA, SCTP), Signaling Gateway and SIP (visited Oct. 13, 2003) <http://www.ulticom.com/html/signalingresources/signalingbackground.asp>.

Northridge, Steve, *Convergent SS7 Signaling For Seamless Service Deployment*, Ulticom.

Author Unknown, *Managing VolP with Packet Intelligent Network Service–Achieving Operational Excellence*, SS8 Networks, Inc. Mar. 2003.

Author Unkown, *LIDB Access Service*, Verizon Wholesale Products and Services, 2000 Verizon Communications.

* cited by examiner

MANAGING VARIABLE DATA THROUGH LINE INFORMATION DATABASE (LIDB) ACCESS IN A PUBLIC SWITCHED TELEPHONE NETWORK (PSTN)

BACKGROUND OF THE INVENTION

1. Statement of the Technical Field

The present invention relates to the field of intelligent networks, and more particularly to the use of a line information database (LIDB) disposed within an intelligent network.

2. Description of the Related Art

The intelligent network of today bears little semblance to the public switched telephone network (PSTN) of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), Toll Free Calling database and other databases containing customer information or additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs), databases containing service logic and subscriber information which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The LIDB is a database configured for coupling to the PSTN through an SCP. The LIDB typically includes amorphous records arranged to store information regarding telephone callers, such as the business name of the caller, the address of the caller, billing information for the caller, and the like. By storing invariable information regarding the caller, such as the name, address and billing method, many intelligent telephonic services can be provided over the PSTN through a simple query to the LIDB. In this regard, several local exchange carriers have deployed independent LIDB access services to facilitate the deployment of intelligent telephonic services which can exploit the invariant information stored within the LIDB.

LIDB access can provide significant advantages in call processing where the invariant information provided through LIDB access need not be collected independently subsequent to the completion of a call. In this regard, basic information regarding the caller, including billing information, can be provided prior to the completion of the call circuit—which can be particularly effective in the context of fraud prevention. Yet, despite the new frontier of intelligent services afforded through LIDB access, invariant information alone cannot suffice for a truly effective call processing. Rather, it would be preferable to access variable state data for a call, as well.

SUMMARY OF THE INVENTION

The present invention addresses the deficiencies of the art in respect to the use of the LIDB in the PSTN and provides a novel and non-obvious method, system and apparatus for managing variable information in the LIDB. In summary, an LIDB which have been configured in accordance with the present invention and which further has been disposed within a PSTN can include a first collection of invariant data persisted in individual records in the LIDB. Each of the records can have an association with a subscriber in the PSTN. A second collection of variable data can be persisted in the individual records in the LIDB. Specifically, the variable data can have been produced in an application deployed outside of the PSTN in a data communications network. Finally, a query interface can be included in the LIDB (or in association with the LIDB) to retrieve the variable data therein and to persist variable data therein.

In a system for managing variable data through LIDB access in a PSTN can include a LIDB coupled to an SCP in a PSTN, an enterprise application deployed outside of the PSTN in a data communications network, a gateway node communicatively coupled both to the SCP in the PSTN and to the enterprise application in the data communications network, and cookie writing logic communicatively linked to the enterprise application and programmed to write variable data to the LIDB in the PSTN. The system also can include logic communicatively linked to the enterprise application to retrieve from the LIDB variable data associated with a caller placing a call to a called party accessing the enterprise application.

In a method for managing variable data through LIDB access in a PSTN, a call can be received from a caller over the PSTN. The call can be established and subsequently terminated. Variable data produced during the call can be collected the collected variable data can be persisted in a record in the LIDB associated with the caller. The method also can include the steps of retrieving variable data from a record in the LIDB associated with the caller prior to establishing the call and utilizing the retrieved variable data during the call. In either case, the collecting step can include the step of collecting the variable data in an enterprise application coupled to a gateway node in the PSTN. Moreover, the persisting step can include the step of accessing logic in a gateway node in the PSTN programmed to post data storage messages through the PSTN to the LIDB via an SCP.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for accessing variable data through LIDB access. Specifically, in accordance with the present invention, a call connection can be processed in a PSTN to connect a calling party with a called party. During the course of the call connection, variable information regarding the call can be collected outside of the PSTN. Examples can include the name of the caller, a preferred service or a customer identifier. Once the call connection has been completed, the collected information can be written to a record in the LIDB within the PSTN which corresponds to the calling party. Subsequently, prior to the establishment of another call connection initiated by the calling party, the information regarding the call can be retrieved from the LIDB in the PSTN and forwarded for use by the called party outside of the PSTN.

Figure 1:
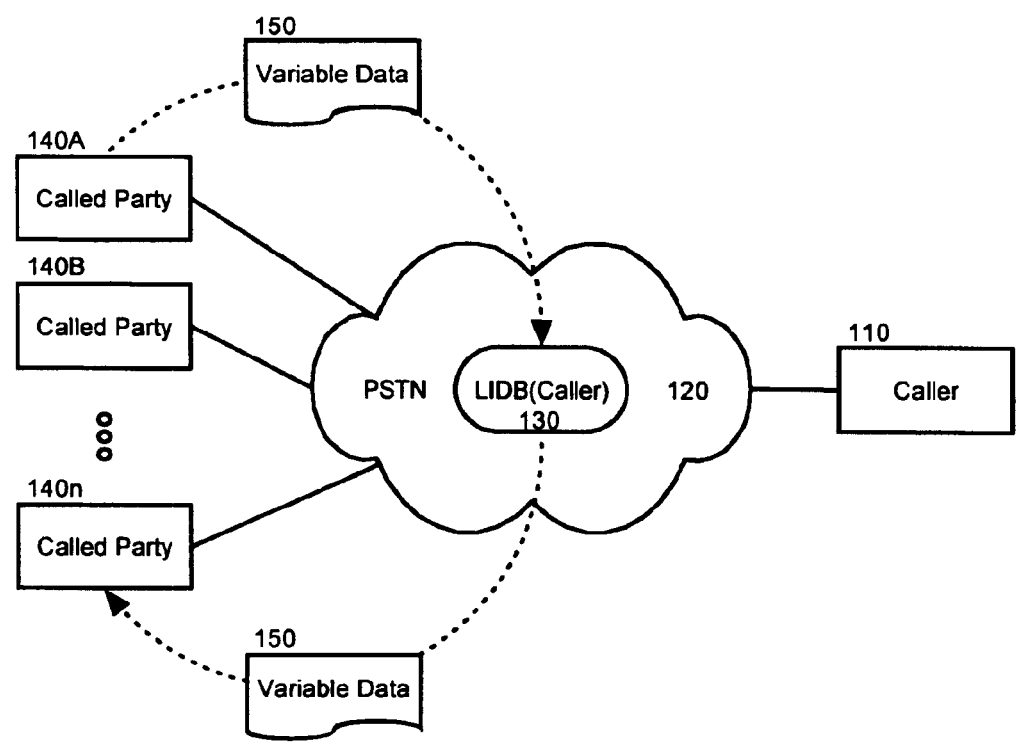
FIG. 1 is a block diagram illustrating a process for managing variable data through LIDB access in accordance with the present invention.

In further illustration, FIG. 1 is a block diagram depicting a process for managing variable data through LIDB access in accordance with the present invention. As shown in FIG. 1, a caller 110 can establish a connection with one or more called parties 140A, 140B, 140n over the PSTN 120. LIDB 130 can be disposed within the PSTN 120 and can be accessed from within the PSTN 120 to process invariant data associated with the caller 110 such as the name, address and billing information associated with the caller 110. Unlike prior art uses of a LIDB, however, variable data 150 further can be stored within the LIDB 130 along with the invariant data.

In this regard, variable data 150 generated outside of the PSTN can be stored in the LIDB 130 for subsequent retrieval during a subsequently occurring call placed between the caller 110 and any of the called parties 140A, 140B, 140n. For instance, during a first call between the caller 110 and the called party 140A, variable data 150 produced in the course of the phone call, such as the name of the called party 140A, can be stored in the LIDB 130 during the course of or subsequent to the completion of the phone call. When the called party 110 establishes a telephone call with the called party 140n, the variable data 150 can be retrieved from the LIDB 130 and presented to the called party 140n. Hence, the storage of the variable data 150 within the LIDB 130 can serve the same purpose as the purpose of the venerable cookie in the art of Internet communications.

Figure 2:
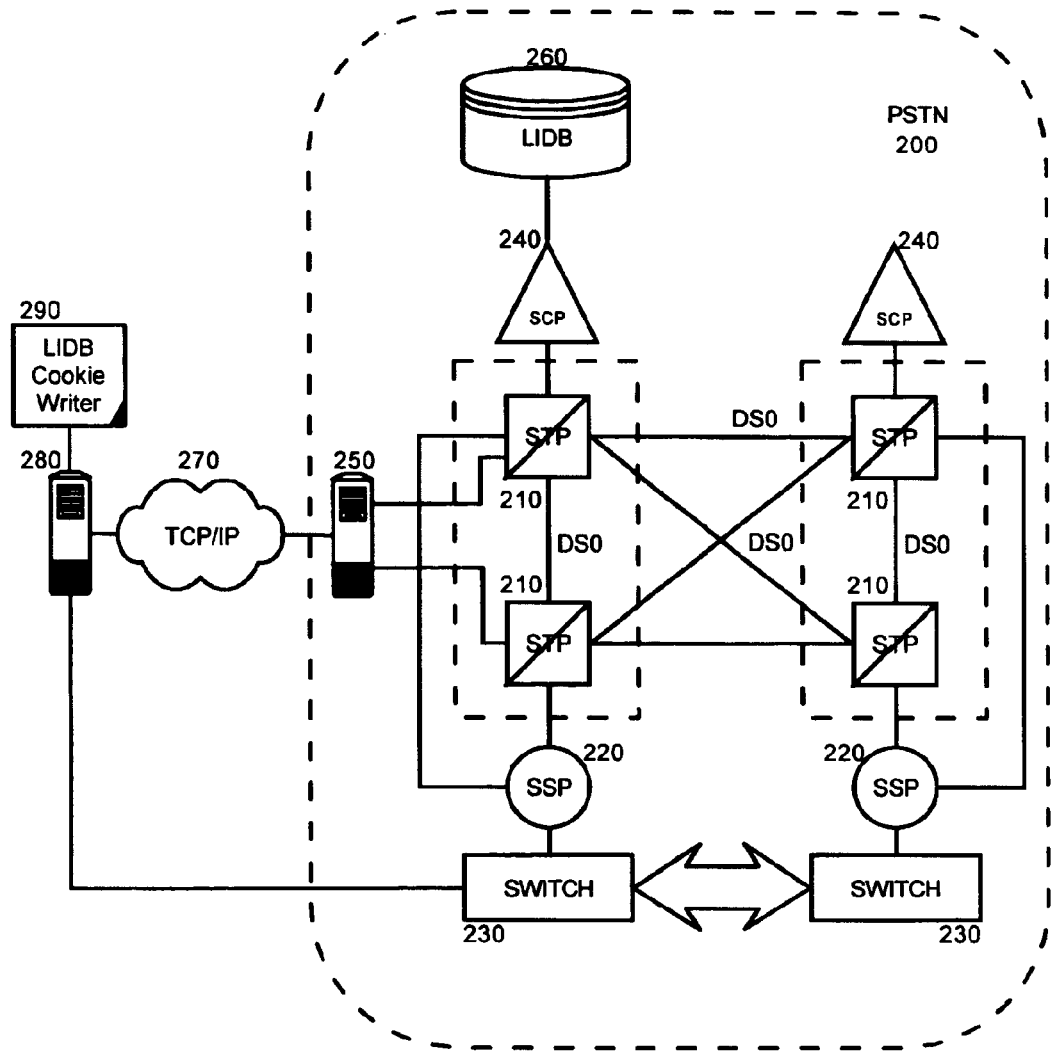
FIG. 2 is a schematic illustration of a system for managing variable data through LIDB access; and, FIG. 3 is a flow chart illustrating a process for managing variable data through LIDB access in the system of FIG. 2.

Importantly, a system for managing variable data through LIDB access can facilitate the foregoing methodology. In this regard, FIG. 2 is a schematic illustration of a preferred arrangement of the system for managing variable data through LIDB access. As shown in FIG. 2, a system for managing variable data through LIDB access can include one or more telephonic switches 230 coupled to one another within a PSTN 200. Each of the switches 230 can be communicatively linked to a service switching point (SSP) 220 coupled to an out-of-band signaling network comprised of a multiplicity of signal transfer points (STP) 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art and embodied within the SS7 signaling network. The SCP 240 can be coupled to a LIDB 260 which can be configured to store invariant data such as the name, address and billing information for callers. Each set of invariant data for a caller can be stored in an amorphous record in the LIDB 260 which itself can be nothing more than a database such as a flat file database, an object database or a relational database. In any event, through the communicative linkages between the SCP 240, the STP 210 and the LIDB 260, transaction capabilities application part (TCAP) messages can be processed in the SCP 240 to access the invariant data in the LIDB 260. In this way, calls processed through the switch 230 can access logic in the SCP 240 and data in the LIDB 260 through the SSP 220.

Notably, a gateway node 250 can be coupled to the out-of-band network comprised of inter-connected STPs 210 to access data and logic through the SCP 240 through an exchange of messages such as TCAP messages. As a gateway, the gateway node 250 can include an interface to the PSTN 200 and an interface to a data communications network 270 such as an Internet Protocol driven network. In this way, data received through the PSTN 200, and more particularly from accessing the LIDB 260 in the PSTN 200 can be passed within IP packets to a client computing device 280 over the data communications network 270. Also, as the client computing device 280 can be coupled to a switch 230 within the PSTN 200 through an associated adapter, LIDB 260 invariant data regarding an incoming call can be processed within the client computing device 280.

In a preferred aspect of the present invention, an LIDB cookie writer 290 can be coupled to the client computing device 280. The LIDB cookie writer 290 can command the gateway node 250 to write data entries to the LIDB 260 in association with the identity of a particular calling party. In this way, variable data can be stored within the LIDB 260 in the same way as variable data can be stored in a cookie in a network computing device of the Internet art. To facilitate the writing of variable data, the LIDB 260 can expose an interface (not shown) to the gateway node 250 such that the variable data can be written in conjunction with the invariant data ordinarily associated with a particular caller in the LIDB 260.

Figure 3:
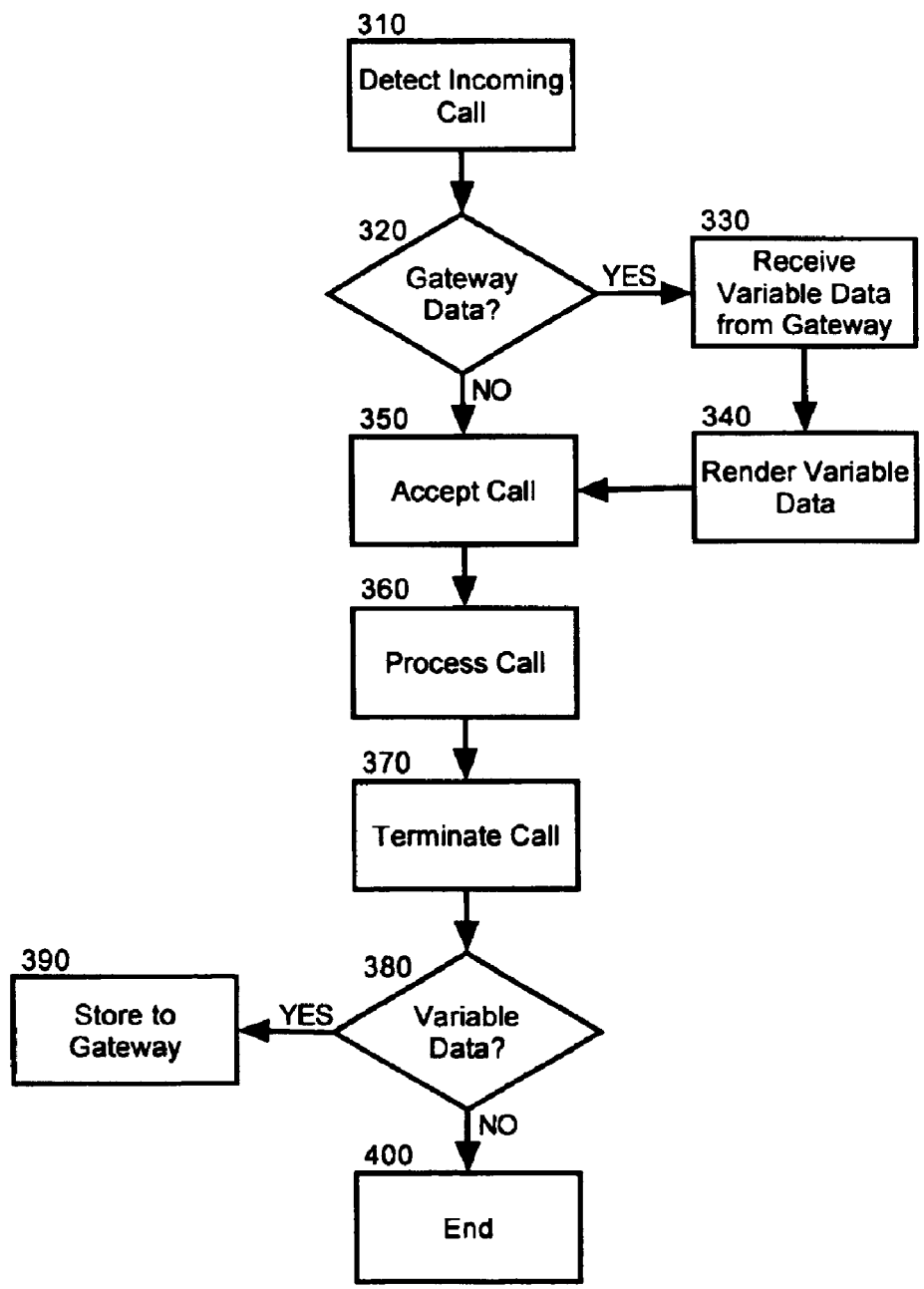

In operation, then, the variable data within the LIDB 260 can be provided to the client computing device 280 by way of the gateway node 250 when an associated calling party attempts to establish a telephonic call with the client computing device 280 through the PSTN 200. In further illustration, FIG. 3 is a flow chart illustrating a process for managing variable data through LIDB access in the system of FIG. 2. Beginning in block 310 the incoming call can be detected. Concurrently, in decision block 320 it can be determined whether gateway data is available through the gateway node. That is, within the PSTN the variable data associated with the calling party can be retrieved from the LIDB and provided to the gateway node for delivery to the called party before the called party accepts the call.

If variable data can be retrieved from the gateway node, in block 330 the variable data can be received from the gateway node and in block 340 the variable data can be rendered for use by the called party. In either case, in block 350 the call can be accepted and in block 360 the call can be processed before the call can be terminated in block 370. It will be recognized by the skilled artisan that the foregoing embodiment can have particular and advantageous effect within the call center configuration in which a bank of customer service or sales agents process incoming calls from customers or potential customers.

To enhance the ability of the called party to process calls in the call center, then, it will be extraordinarily advantageous to store variable data regarding the nature of the call to persistent storage such that during a future call with the same calling party, it will be recognized by the agent what had transpired previously. Thus, to the extent it is determined in decision block 380 that variable data has been generated during the course of the call, in block 390 the variable data can be stored in the LIDB through the gateway node. Subsequently, in block 400 the process can end. As a result, during a subsequent call, the variable data can be retrieved from the LIDB and provided to the called party for use in servicing the call in blocks 350 through 370.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A line information database (LIDB) disposed within a public switched telephone network (PSTN) comprising:

a first collection of invariant data persisted in individual records in the LIDB, each of said records having an association with a subscriber in the PSTN;

a second collection of variable data persisted in said individual records in the LIDB, said variable data having been produced in an application deployed outside of the PSTN in a data communications network; and, a query interface to retrieve said variable data from the LIDB and to persist variable data in the LIDB.

2. A system for managing variable data through line information database (LIDB) access in a public switched telephone network (PSTN), the system comprising:

a LIDB coupled to a service control point (SCP) in the PSTN;

an enterprise application deployed outside of the PSTN in a data communications network;

a gateway node communicatively coupled both to said SCP in the PSTN and to said enterprise application in said data communications network; and, cookie writing logic communicatively linked to said enterprise application and programmed to write variable data to said LIDB in the PSTN.

3. The system of claim 2, further comprising logic communicatively linked to said enterprise application to retrieve from said LIDB variable data associated with a caller placing a call to a called party accessing said enterprise application.

4. A method for managing variable data through line information database (LIDB) access in a public switched telephone network (PSTN), the method comprising the steps of:

receiving a call from a caller over the PSTN;

establishing said call and subsequently terminating said call;

collecting variable data produced during said call; and, persisting said collected variable data in a record in the LIDB associated with said caller;

retrieving variable data from a record in the LIDB associated with said caller prior to establishing said call; and, utilizing said retrieved variable data during said call.

5. The method for managing variable data through line information database (LIDB) access in a public switched telephone network (PSTN), the method comprising the steps of:

receiving a call from a caller over the PSTN;

establishing said call and subsequently terminating said call;

collecting variable data produced during said call; and, persisting said collected variable data in a record in the LIDB associated with said caller;

wherein said collecting step comprises the step of collecting said variable data in an enterprise application coupled to a gateway node in the PSTN.

6. The method for managing variable data through line information database (LIDB) access in a public switched telephone network (PSTN), the method comprising the steps of:

receiving a call from a caller over the PSTN;

establishing said call and subsequently terminating said call;

collecting variable data produced during said call; and, persisting said collected variable data in a record in the LIDB associated with said caller;

wherein said persisting step comprises the step of accessing logic in a gateway node in the PSTN programmed to post data storage messages through the PSTN to the LIDB via a service control point (SCP).

7. A machine readable storage having stored thereon a computer program for managing variable data through line information database (LIDB) access in a public switched telephone network (PSTN), the computer program comprising a routine ste of instructions which when executed by the machine cause the machine to perform the steps of:

receiving a call from a caller over the PSTN;

establishing said call and subsequently terminating said call;

collecting variable data produced during said call; and, persisting said collected variable data in a record in the LIDB associated with said caller;

retrieving variable data from a record in the LIDB associated with said caller prior to establishing said call; and, utilizing said retrieved variable data during said call.

8. A machine readable storage having stored thereon a computer program for managing variable data through line information database (LIDB) access in a public switched telephone network (PSTN), the computer program comprising a routine ste of instructions which when executed by the machine cause the machine to perform the steps of:

receiving a call from a caller over the PSTN;

establishing said call and subsequently terminating said call;

collecting variable data produced during said call; and, persisting said collected variable data in a record in the LIDB associated with said caller;

wherein said collecting step comprises the step of collecting said variable data in an enterprise application coupled to a gateway node in the PSTN.

9. A machine readable storage having stored thereon a computer program for managing variable data through line information database (LIDB) access in a public switched telephone network (PSTN), the computer program comprising a routine ste of instructions which when executed by the machine cause the machine to perform the steps of:

receiving a call from a caller over the PSTN;

establishing said call and subsequently terminating said call;

collecting variable data produced during said call; and, persisting said collected variable data in a record in the LIDB associated with said caller;

wherein said persisting step comprises the step of accessing logic in a gateway node in the PSTN programmed to post data storage messages through the PSTN to the LIDB via a service control point (SCP).

* * * * *